US009148457B2

(12) United States Patent
Van Der Meer

(10) Patent No.: US 9,148,457 B2
(45) Date of Patent: Sep. 29, 2015

(54) ESTABLISHING A COMMUNICATION SESSION

(75) Inventor: Jan Van Der Meer, Rijen (NL)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 106 days.

(21) Appl. No.: 13/505,873

(22) PCT Filed: Dec. 11, 2009

(86) PCT No.: PCT/EP2009/066986
§ 371 (c)(1),
(2), (4) Date: May 25, 2012

(87) PCT Pub. No.: WO2011/069559
PCT Pub. Date: Jun. 16, 2011

(65) Prior Publication Data
US 2012/0243531 A1 Sep. 27, 2012

(51) Int. Cl.
*H04L 12/66* (2006.01)
*H04L 29/06* (2006.01)
(Continued)

(52) U.S. Cl.
CPC ............ *H04L 65/40* (2013.01); *H04L 65/4015* (2013.01); *H04M 3/5183* (2013.01); *H04M 7/003* (2013.01); *H04M 2207/203* (2013.01)

(58) Field of Classification Search
CPC . H04L 65/40; H04L 65/4015; H04M 3/5183; H04M 7/003; H04M 2207/203
USPC ........................................................ 370/352
See application file for complete search history.

(56) References Cited

U.S. PATENT DOCUMENTS 6,748,420 B1 * 6/2004 Quatrano et al. ............. 709/205
2002/0021792 A1 * 2/2002 Shimizu et al. .......... 379/201.01
(Continued)

FOREIGN PATENT DOCUMENTS

EP 1940137 A2 7/2008
WO 0186897 A1 11/2001

OTHER PUBLICATIONS

Kaplan, "A Session Identifier for the Session Initiation Protocol (SIP)", Mar. 8, 2009, SIP Working Group, draft-kaplan-sip-session-id-02, 11 pages.*

*Primary Examiner* — Brian J Gillis
*Assistant Examiner* — Amy Ling
(74) *Attorney, Agent, or Firm* — Coats & Bennett, PLLC

(57) ABSTRACT

Parallel communication sessions can be established. A system receives an email communication from a user computer, and sends a reply to the user computer, wherein the reply includes a link allowing the user computer to establish a connection to a server; and wherein the link further includes an identifier. The system then receives from the user computer a connection request based on the link, said connection request including the identifier and specifying a first phone number associated with the user computer. The system then invokes an application for establishing a first voice connection with a first terminal identified by said first phone number, establishing a second voice connection with a second terminal identified by a second phone number indicated as associated with a computer terminal, and interconnecting the first and second voice connections to establish a voice call between the first and second terminals. The system also establishes a data connection with the user computer in response to the connection request, and establishes a data connection with the computer terminal, such that the user computer and the computer terminal can share a multimedia session, such that the voice call and the multimedia session are each associated with the identifier.

15 Claims, 2 Drawing Sheets

(51) Int. Cl.
*H04M 3/51* (2006.01)
*H04M 7/00* (2006.01)

(56) References Cited

U.S. PATENT DOCUMENTS

| | | |
|---|---|---|
| 2003/0016658 A1* | 1/2003 | Creamer et al. ............. 370/352 |
| 2003/0043991 A1 | 3/2003 | Kriechbaum et al. |
| 2003/0214942 A1* | 11/2003 | Ali et al. ...................... 370/352 |
| 2005/0138122 A1* | 6/2005 | Boehringer et al. .......... 709/205 |
| 2005/0195962 A1* | 9/2005 | Brown ..................... 379/265.02 |
| 2007/0083678 A1* | 4/2007 | Bateman et al. .................. 710/6 |
| 2007/0121526 A1* | 5/2007 | Sung et al. ................... 370/252 |
| 2008/0043091 A1* | 2/2008 | Lia et al. .................... 348/14.09 |
| 2008/0152116 A1* | 6/2008 | Sylvain .................... 379/216.01 |
| 2009/0161843 A1* | 6/2009 | Sylvain ...................... 379/93.09 |
| 2009/0164639 A1* | 6/2009 | Sylvain ........................ 709/227 |
| 2010/0157013 A1* | 6/2010 | Sylvain ..................... 348/14.01 |
| 2013/0128883 A1* | 5/2013 | Lawson et al. ............... 370/352 |

* cited by examiner

ESTABLISHING A COMMUNICATION SESSION

TECHNICAL FIELD

This invention relates to establishing a communication session between two parties, and in particular to establishing parallel voice and browser sessions.

BACKGROUND

There is known, for example from EP-1940137A, a method of setting up a call between two parties from within a network. A service provider can have a clickable button on a webpage that can be accessed by a member of the public using a web browser in a user terminal. When the user clicks the button, a web server sets up a call, either between the user terminal and a remote endpoint, or between another terminal associated with the user and the remote endpoint.

There are also known, for example from U.S. Pat. No. 7,003,090, methods that enable document sharing using a web browser, allowing inputs generated by one user to be visible to another user.

SUMMARY

It is an object of the present invention to allow two parties to take part in a voice call, while at the same time sharing a multimedia session, for example for document sharing.

Although separate methods are known for setting up voice calls between parties, and for enabling document sharing, it would be advantageous to be able to provide a single solution that provides both possibilities at the same time.

According to a first aspect of the present invention, there is provided a method of establishing parallel communication sessions, comprising receiving an email message from a user computer; and sending a reply to the user computer, wherein the reply includes a link allowing the user computer to establish a connection to a server; and wherein the link further includes an identifier. The method then comprises receiving from the user computer a connection request based on the link, said connection request including the identifier and specifying a first phone number associated with the user computer. In response, the method comprises invoking an application for establishing a first voice connection with a first terminal identified by said first phone number, establishing a second voice connection with a second terminal identified by a second phone number indicated as associated with a computer terminal, and interconnecting the first and second voice connections to establish a voice call between the first and second terminals. In addition, a data connection is established with the user computer in response to the connection request, and a data connection is established with the computer terminal, such that the user computer and the computer terminal can share a multimedia session, and such that the voice call and the multimedia session are each associated with the identifier.

This has the advantage that parallel voice and multimedia sessions can conveniently be set up.

In some embodiments, the method further comprises storing the identifier at the computer terminal before sending the reply to the user computer, for example in association with relevant information from the email message from the user computer.

The application for establishing and interconnecting the first and second phone connections may be an Intelligent Network application, or may be an Internet Protocol Multimedia Subsystem application.

The reply sent to the user computer may include the first phone number, and the connection request sent from the user computer confirms the first phone number, or the reply sent to the user computer may include a field for inclusion of the first phone number for sending from the user computer.

The step of establishing the data connection with the user computer in response to the connection request may comprise allowing web browser software in said user computer to view a web page hosted on the server, while the multimedia session may allow data inputs at the computer terminal to be displayed in a web browser of the user computer; and may allow data inputs in the web browser of the user computer to be displayed on the computer terminal.

According to a second aspect of the present invention, there is provided a method of establishing parallel communication sessions, comprising receiving a request for an identifier, following an email message from a user computer; and generating an identifier, for inclusion in a link to be sent in reply to the user computer, wherein the link allows the user computer to establish a connection to a server. On receiving from the user computer a connection request based on the link, said connection request including the identifier and specifying a first phone number associated with the user computer, an application is invoked for establishing a first voice connection with a first terminal identified by said first phone number, establishing a second voice connection with a second terminal identified by a second phone number indicated as associated with a computer terminal, and interconnecting the first and second voice connections to establish a voice call between the first and second terminals. Also, a data connection is established with the user computer in response to the connection request, and a data connection is established with the computer terminal, such that the user computer and the computer terminal can share a multimedia session, such that the voice call and the multimedia session are each associated with the identifier.

According to other aspects of the invention, there are provided computer systems operating in accordance with the first aspect of the invention, computer servers operating in accordance with the second aspect of the invention, and computer program products, comprising code for causing devices to operate in accordance with the other aspects of the invention.

DETAILED DESCRIPTION

Figure 1:
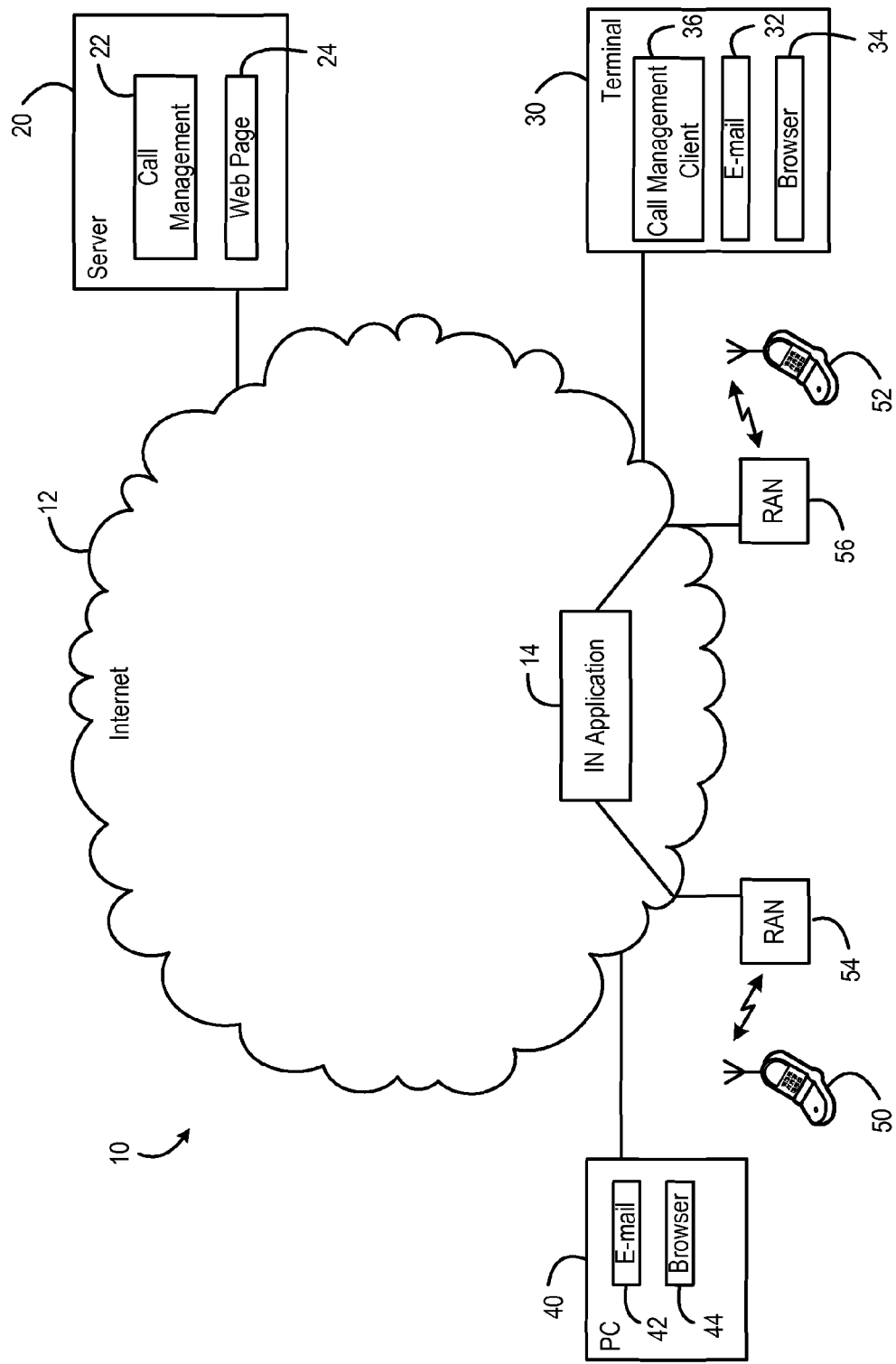
FIG. 1 illustrates a communication network operating in accordance with an aspect of the present invention.

FIG. 1 shows a communication system 10, which is of generally conventional form, except as described in more detail below. The communication system 10 is based around the use of a wide area network for carrying packet data, typically the internet 12. Located in the wide area network 12 is an Intelligent Network (IN) application 14 that is able to establish telephone calls between users, as will be described in more detail below.

A server 20 is connected to the internet 12. The server 20 is generally conventional, but is provided with call management software 22 that operates as described below, and hosts a web page 24, which is also described below.

A computer terminal 30 is also connected to the internet 12. The terminal 30 is generally conventional. For example, the terminal 30 might take the form of a conventional personal computer (PC), with email software 32 and web browser software 34, and it is also provided with call management client software 36 that operates as described below.

In a typical embodiment of the invention, the server 20 is under the control of the same entity as the terminal 30, allowing the installation of call management software 22 and call management client software 36 that complement each other. In another embodiment, the server 20 supports terminals 30 in multiple companies. Also, typically, the server 20 is able to work with multiple such terminals, although it is necessary to show and describe only one such terminal here for the purposes of explaining the invention. As an alternative, the call management client software 36 might be running on one computer that controls multiple terminals, each being staffed by a respective helpdesk operator. In principle, it would be possible for all of the functions of the server 20 and the terminal 30, as described herein, to be performed in a single PC. Thus, the server 20 and the computer terminal 30 effectively form a single system, and the functions of the server 20 and the computer terminal 30, as described herein, can be distributed between them, and/or shared with any other computer, in any convenient manner.

A second computer terminal, for example in the form of a PC 40, is also connected to the internet 12. The PC 40 is generally conventional, with email software 42 and web browser software 44. Although shown here as a PC with a wired connection to the internet, it will be appreciated that equivalent functionality can be provided in a wireless device, including a cellular wireless device, for example a laptop, smartbook or netbook device.

FIG. 1 also shows two terminals, in the form of telephones 50, 52. As illustrated in FIG. 1, the telephones 50, 52 are cellular phones, connected to the packet data network 12 by means of respective radio access networks 54, 56. However, this is purely for the purposes of illustration, and the telephones 50, 52 can be landline telephones or telephones of any other type, and they can be connected to any type of call-handling network, provided that the IN application 14 is able to establish calls therewith.

As described in more detail below, it is the intention that the telephone 50 should be in use by the same person as the PC 40. Similarly, it is the intention that the telephone 52 should be in use by the same person as the terminal 30. It will be appreciated that, while the telephones 50, 52 are shown as completely separate from the PC 40 and the server 30, they might equally be provided by means of voice call software applications installed on the respective computers.

In the illustrative use of the invention, the terminal 30 is being used by a helpdesk of an equipment or service provider, and the PC 40 is being used by a customer of the equipment or service provider, and the invention will be described below with reference to this situation, but it will be appreciated that the invention can equally be applied in other situations.

The process is therefore described with reference to FIG. 2, which illustrates the flow of messages between the end user PC 40, the call management client software 36 in the terminal 30, and the server 20, in one illustrative example.

The process begins with email message M1 when the end user on the PC 40 sends an email (for example describing a problem with a product supplied by an equipment provider or asking a question about the product) from the email client software 42 to the email client 32 of the terminal 30 acting as a support desk, the relevant email address having being notified by the equipment provider to its customers.

It will be appreciated that the email client 32 may not be directly associated with the terminal 30, and may instead for example be located on a different computer in the organization owning or controlling the computer terminal 30.

On receipt of the email message M1, the call management client 36 in the terminal 30 sends a message M2a to the server 20, requesting a unique identifier. The server 20 responds to the terminal 30 with a message M2b containing the requested unique identifier. Within the call management client 36 in the terminal 30, this identifier is then associated with any relevant information that might be of assistance to the helpdesk operator when eventually dealing with the issue raised in the email message M1. For example, where the helpdesk operator is able to assist customers of multiple companies, or where the server 20 can support helpdesk operators in multiple companies, the identity of the relevant company is attached to the identifier. As another example, when the telephone number of the customer is already known (for example from information previously supplied by the customer), this is stored with the identifier. Any other relevant information, from the email message M1 or from other sources, can also be stored.

The call management client software 36 then arranges for an email message M3 to be sent from the email client 32 of the server 30 (or from the separate email client mentioned above) to the PC 40 via its email client 42. The email message M3 invites the customer to proceed further to receive browser support. Specifically, the response email message M3 contains a link to the web page 24 hosted on the server 20. For example, the link might be provided simply as a clickable URL, or as a clickable icon pointing to the URL, that identifies the web page 24. In either case, the unique identifier notified from the server 20 to the terminal 30 is included as a parameter in the URL. The message M3 indicates to the user of the PC 40 that he should follow the link to begin a voice/browser communication support session.

When the end user, having received the reply email message M3, clicks on the link provided, this causes the web browser software 44 on the PC 40 to start. Using the URL associated with the link, the browser 44 causes a message M4 to be sent to the server 20 to start a session therewith and open the web page 24. In the server 20, the unique identifier that was included as a parameter in the URL used by the message M4 can be retrieved, and can be used to collect any relevant information that was included in the message M2a.

In addition, the web page 24 provided to the browser software 44 allows the user to enter a phone number where he can be reached, that is, the number of the telephone 50. The user is informed that submitting this information will cause a voice call to the company to be established. As an alternative, when the same user has previously contacted the helpdesk, or the service provider has previously received the user's telephone number from information provided by the user, the web page can contain this telephone number, and the user can be asked to confirm this number in the web page before submission.

Having received the submission from the user, the server 20 sends a message M5, initiating communication to the call management client 36 at the company support desk, and providing the relevant information.

Thus, HTTP sessions 70, 72 are established between the server 20 and the call management client 36, and between the server 20 and the browser software 44 of the PC 40 respectively. This effectively allows a multimedia session to be started between the computer 30 and the computer 40, as will be described in more detail below.

At this time, the call management software 22 in the server 20 is able to monitor the availability of the or each helpdesk operator on the or each terminal 30. When an operator is available to handle an interaction with the user, this is indicated to the call management client 36, and forwarded to the server 20, and thus notified to the user by means of a message in the web page 24 that is visible in the browser software 44.

The user is then able at any time to click a 'submit' button, or the like, in this web page to send an acknowledgement message M6 to the server 20.

On receipt of an acknowledgement message M6, the server 20 establishes a connection M7 through an Intelligent Networking application interface to the Intelligent Networking application 14. The server 20 is able to provide the application 14 with the telephone numbers of the telephones 50, 52 in a suitable protocol message. The application 14 uses an existing Click-to-Call solution, in order to set up a first network-originated voice call (message M8a) to the user's telephone 50, and to set up a second network-originated voice call (message M8b) to the telephone 52 associated with the support desk. Having set up these two calls, the application 14 can interconnect the two calls (message M8c). At the same time, the helpdesk operator at the terminal 30 is provided with relevant information linked to the question or problem mentioned in the original email message M1, allowing the helpdesk operator to provide a more efficient service to the user.

The user is thus able to speak to the helpdesk operator by means of the interconnected voice calls. For example, the user can describe in more detail the problem that led him to call the helpdesk, while the helpdesk operator can provide verbal instructions on how to resolve the problem.

In addition, the server 20 acts to interconnect the web browsers 34, 44 on the terminal 30 and on the PC 40, respectively, in a multimedia session.

The telephone number of the user's telephone 50 is contained in the user's submission to the server 20, and is then supplied by the server 20 to the Intelligent Networking application 14, and used by the application 14 to establish the voice call to the user 50. This telephone number can for example be a telephone number in accordance with the E.164 numbering plan when the user's telephone is a conventional fixed or mobile telephone, or can be a Session Initiation Protocol (SIP) Uniform Resource Identifier (URI) when the user's terminal is in the form of voice call software on the PC 40 or on another device. The telephone number of the user's telephone 50 is used to relate the multimedia session with the voice call.

Figure 2:
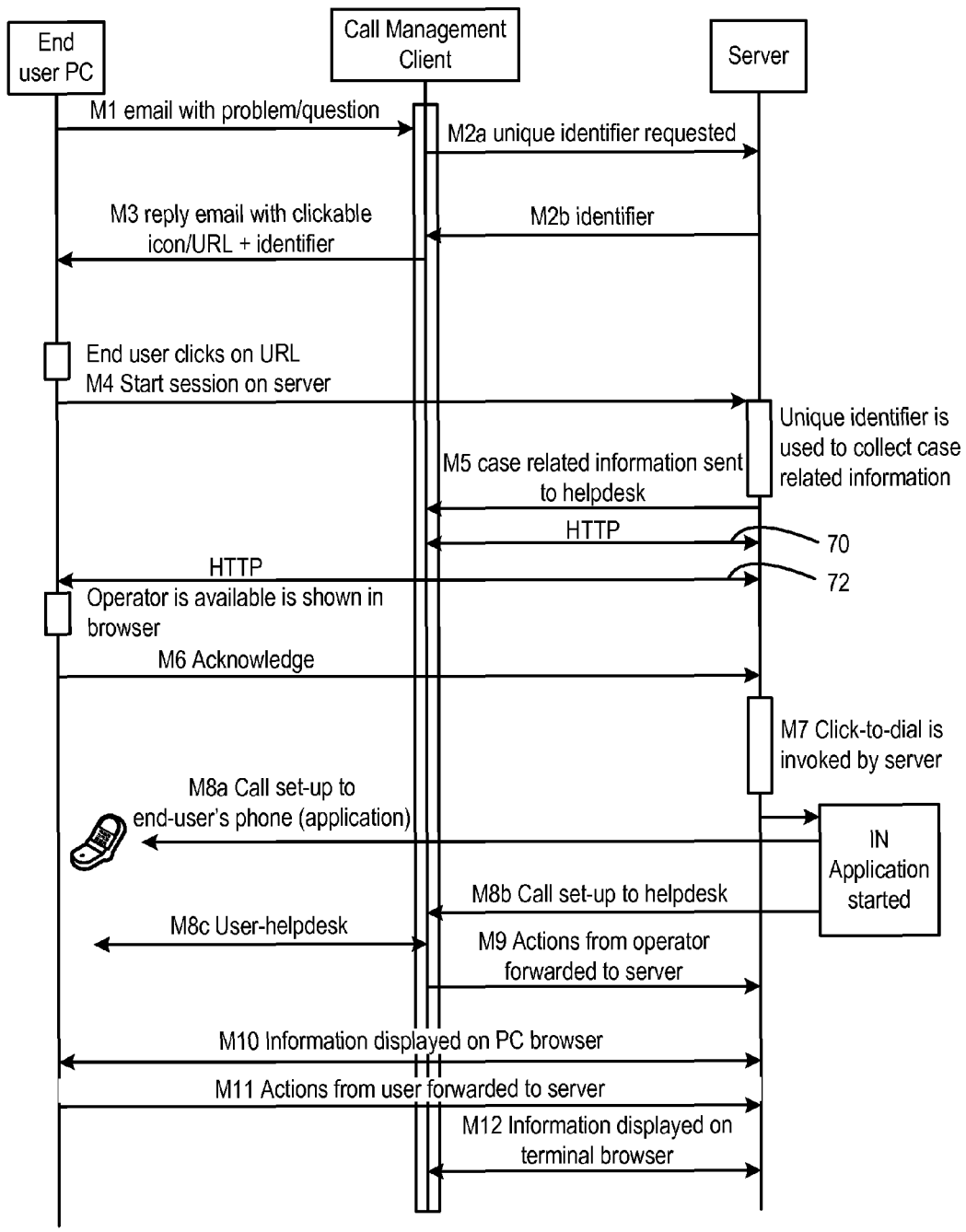
FIG. 2 illustrates a method in accordance with an aspect of the present invention.

In the multimedia session, when the helpdesk operator at the terminal 30 provides images or text on a screen of the terminal 30, this is passed to the call management client 36, and the information is forwarded to the server 20, shown as message M9 in FIG. 2. Thus, while the user and the help desk operator discuss the problem, the server 20 can through the call management software 22 cause the images or text to be displayed on the browser 44 of the PC 40, shown as message M10 in FIG. 2.

For example, the call management client 36 could cause two areas to be displayed on the screen of the computer terminal 30, one for images and one for text. Then, when the helpdesk operator uses the computer mouse to drag an image into the image area, the actual file is uploaded by the call management client 36 to the call management function 22 in the server 20. The server 20 then reformats the file if necessary, and packs the image file in a Hypertext Markup Language (HTML) frame, which is then displayed on the browser 44 in the user computer 40. This interaction between the call management function 22 and the browser 44 can be based on existing AJAX technology for this purpose.

Conversely, a user can make various inputs on the PC 40, such as text inputs to insert new text or modify or highlight text in a document, mouse movements or clicks on the image displayed. These inputs are passed by the browser software 44 to the server 20, shown as message M11 in FIG. 2, and then forwarded as message M12 to the call management client 36 for display on the terminal 30.

For example, if a user has a problem with a product made by the equipment provider, but is unable to describe clearly which model he owns, the helpdesk operator can cause the web browser software 44 on the user's computer 40 to display images of all of the models made by the equipment provider. The user can then identify the intended model, either by telling the helpdesk operator, or by entering text through his computer keyboard, or by using his computer mouse, touch screen, or the like. The text entered by the user, or the mouse position, are then visible to the helpdesk operator.

Similarly, if the helpdesk operator is able to determine how the user should resolve his problem, the helpdesk operator may be able to play a video containing a demonstration of the actions that the user should take, and this can similarly be displayed on the web browser software 44 of the user's computer 40. The user may then be able to pause or replay this video as required. At the same time, the user and the helpdesk operator can hold a conversation, allowing the user to ask additional questions if required.

Thus, while communicating by voice, the two parties are also able to exchange visual images or documents, including pointing each other to certain items in the image or document.

As described above, the Click-to-Call function invoked by the server 20 is an Intelligent Network application. However, as an alternative, an Internet Protocol (IP) Multimedia Subsystem (IMS) application server and Session Initiation Protocol (SIP) messages can be used to set up and interconnect the voice calls.

Thus, the voice communication between the parties can be enhanced with a multimedia session provided by a linked data communication channel between the two parties in the call, without requiring any special software installation at the end user side.

The invention claimed is:

1. A method of establishing parallel communication sessions, the method comprising:
   receiving an email message by a computer system from a user computer;
   sending a reply email message to the user computer, wherein the reply email message includes a link allowing the user computer to establish a connection to a server; and wherein the link further includes an identifier;
   receiving, by the computer system, from the user computer, a connection request message via a web page linked to the link, the connection request message including the identifier and specifying a first phone number associated with the user computer;
   identifying by the computer system an available operator associated with a computer terminal;
   notifying the user computer that an operator is available by sending a message via the web page linked to the link;
   receiving an acknowledgement from the user computer via the web page in response to the notification;
   invoking an application at the computer system in response to the acknowledgement, the application configured to:
      establish a first voice connection with a first terminal that is capable of establishing voice calls and is identified by the first phone number;
      establish a second voice connection with a second terminal that is capable of establishing voice calls and is identified by a second phone number indicated as associated with the computer terminal;

interconnect the first and second voice connections to establish a voice call between the first and second terminals;

establishing a data connection with the user computer in response to the connection request, and establishing a data connection with the computer terminal, such that the user computer and the computer terminal can share a multimedia session;

wherein the voice call and the multimedia session are each associated with the identifier; and wherein the method is for providing customer support.

2. The method of claim 1 further comprising storing the identifier at the computer terminal before sending the reply to the user computer.

3. The method of claim 2 further comprising storing the identifier at the computer terminal in association with information from the email message from the user computer.

4. The method of claim 1 wherein the application is an Intelligent Network application.

5. The method of claim 1 wherein the application is an Internet Protocol Multimedia Subsystem application.

6. The method of claim 1:

wherein the reply sent to the user computer includes the first phone number;

wherein the connection request sent from the user computer confirms the first phone number.

7. The method of claim 1 wherein the reply sent to the user computer includes a field for inclusion of the first phone number.

8. The method of claim 1 wherein the establishing the data connection with the user computer in response to the connection request comprises allowing web browser software in the user computer to view a web page hosted on the server.

9. The method of claim 1:

wherein the multimedia session allows data inputs at the computer terminal to be displayed in a web browser of the user computer;

wherein the multimedia session allows data inputs in the web browser of the user computer to be displayed on the computer terminal.

10. A method of establishing parallel communication sessions, the method comprising:

receiving, following an email message from a user computer, a request for an identifier;

generating an identifier for inclusion in a link to be sent in a reply email message to the user computer, wherein the link allows the user computer to establish a connection to a server;

receiving, from the user computer, a connection request via a web page linked to the link, the connection request including the identifier and specifying a first phone number associated with the user computer;

identifying by the server an available operator associated with a computer terminal;

notifying the user computer that an operator is available by sending a message via the web page linked to the link;

receiving an acknowledgement from the user computer via the web page in response to the notification;

invoking an application at the server, the application configured to:

establish a first voice connection with a first terminal that is capable of establishing voice calls and is identified by the first phone number;

establish a second voice connection with a second terminal that is capable of establishing voice calls and is identified by a second phone number indicated as associated with the computer terminal;

interconnect the first and second voice connections to establish a voice call between the first and second terminals;

establishing a data connection with the user computer in response to the connection request, and establishing a data connection with the computer terminal, such that the user computer and the computer terminal can share a multimedia session;

wherein the voice call and the multimedia session are each associated with the identifier; and wherein the method is for providing customer support.

11. The method of claim 10 wherein the establishing the data connection with the user computer in response to the connection request comprises allowing web browser software in the user computer to view a web page hosted on the server.

12. The method of claim 10:

wherein the multimedia session allows data inputs at the computer terminal to be displayed in a web browser of the user computer;

wherein the multimedia session allows data inputs in the web browser of the user computer to be displayed on the computer terminal.

13. A non-transitory computer readable medium storing a computer program product for controlling a server, the computer program product comprising software code instructions which, when run on the server, causes the server to:

receive, following an email message from a user computer, a request for an identifier;

generate an identifier for inclusion in a link to be sent in a reply email message to the user computer, wherein the link allows the user computer to establish a connection to a server;

receive, from the user computer, a connection request via a web page linked to the link, the connection request including the identifier and specifying a first phone number associated with the user computer;

identify by the server an available operator associated with a computer terminal;

notify the user computer that an operator is available by sending a message via the web page linked to the link;

receive an acknowledgement from the user computer via the web page in response to the notification;

invoke an application at the server, the application configured to:

establish a first voice connection with a first terminal that is capable of voice calls and is identified by the first phone number;

establish a second voice connection with a second terminal that is capable of voice calls and is identified by a second phone number indicated as associated with the computer terminal;

interconnect the first and second voice connections to establish a voice call between the first and second terminals;

establish a data connection with the user computer in response to the connection request, and establish a data connection with the computer terminal, such that the user computer and the computer terminal can share a multimedia session;

wherein the voice call and the multimedia session are each associated with the identifier; and wherein the server, when running the computer product program stored on the non-transitory computer readable medium, is used for providing customer support.

14. A computer system, comprising:
an email client configured to receive an email message from a user computer and send a reply email message to the user computer, wherein the reply email message includes a link allowing the user computer to establish a connection to a server, wherein the link further includes an identifier;
a server configured to:
receive, from the user computer, a connection request message via a web page linked to the link, the connection request message including the identifier and specifying a first phone number associated with the user computer;
identify an available operator associated with a computer terminal;
notify the user computer that an operator is available by sending a message via the web page linked to the link;
receive an acknowledgement from the user computer via the web page in response to the notification; and
invoke an application, the application configured to:
establish a first voice connection with a first terminal capable of establishing voice calls and identified by the first phone number;
establish a second voice connection with a second terminal capable of establishing voice calls and identified by a second phone number indicated as associated with the computer terminal;
interconnect the first and second voice connections to establish a voice call between the first and second terminals;
establish a data connection with the user computer in response to the connection request, and establish a data connection with the computer terminal, such that the user computer and the computer terminal can share a multimedia session;
wherein the voice call and the multimedia session are each associated with the identifier; and
wherein the computer system is used for providing customer support.

15. A computer server comprising:
one or more processing circuits configured to:
receive, following an email message from a user computer, a request for an identifier;
generate an identifier for inclusion in a link to be sent in a reply email message to the user computer, wherein the link allows the user computer to establish a connection to a server;
receive, from the user computer, a connection request via a web page linked to the link, the connection request including the identifier and specifying a first phone number associated with the user computer;
identify an available operator associated with a computer terminal;
notify the user computer that an operator is available by sending a message via the web page linked to the link;
receive an acknowledgement from the user computer via the web page in response to the notification; and
invoke an application, the application configured to:
establish a first voice connection with a first terminal that is capable of voice calls and is identified by the first phone number;
establish a second voice connection with a second terminal that is capable of voice calls and is identified by a second phone number indicated as associated with the computer terminal;
interconnect the first and second voice connections to establish a voice call between the first and second terminals;
establish a data connection with the user computer in response to the connection request, and establish a data connection with the computer terminal, such that the user computer and the computer terminal can share a multimedia session;
wherein the voice call and the multimedia session are each associated with the identifier; and
wherein the computer server is used for providing customer support.

* * * * *